June 5, 1934.  M. A. GEROLA  1,961,966
COOKY PASTE DROPPER
Original Filed Sept. 14, 1932   5 Sheets-Sheet 1

INVENTOR
MARIO A. GEROLA
BY
ATTORNEY

June 5, 1934.　　　　M. A. GEROLA　　　　1,961,966
COOKY PASTE DROPPER
Original Filed Sept. 14, 1932　　5 Sheets-Sheet 2

INVENTOR
MARIO A. GEROLA
BY
ATTORNEY

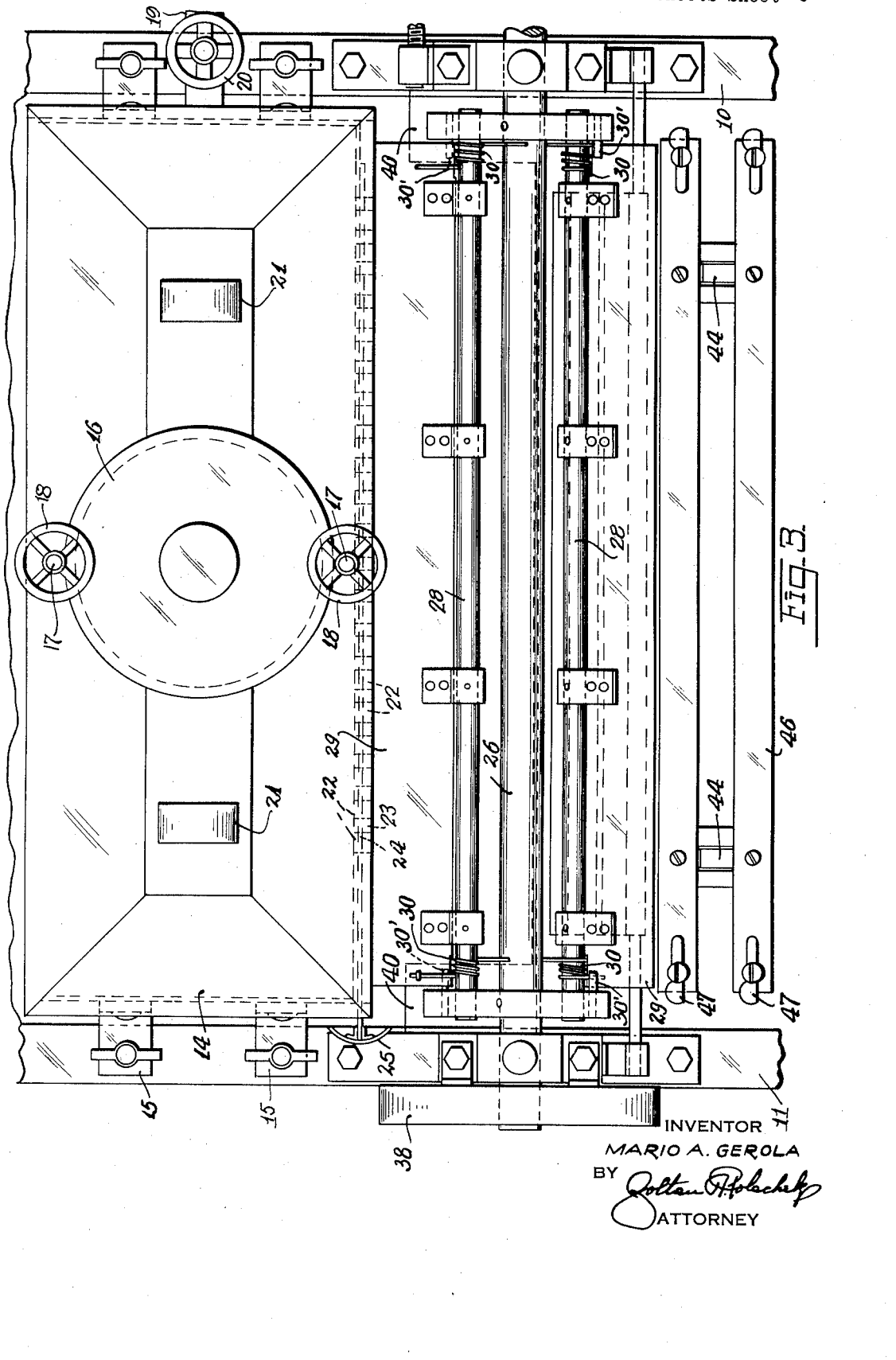

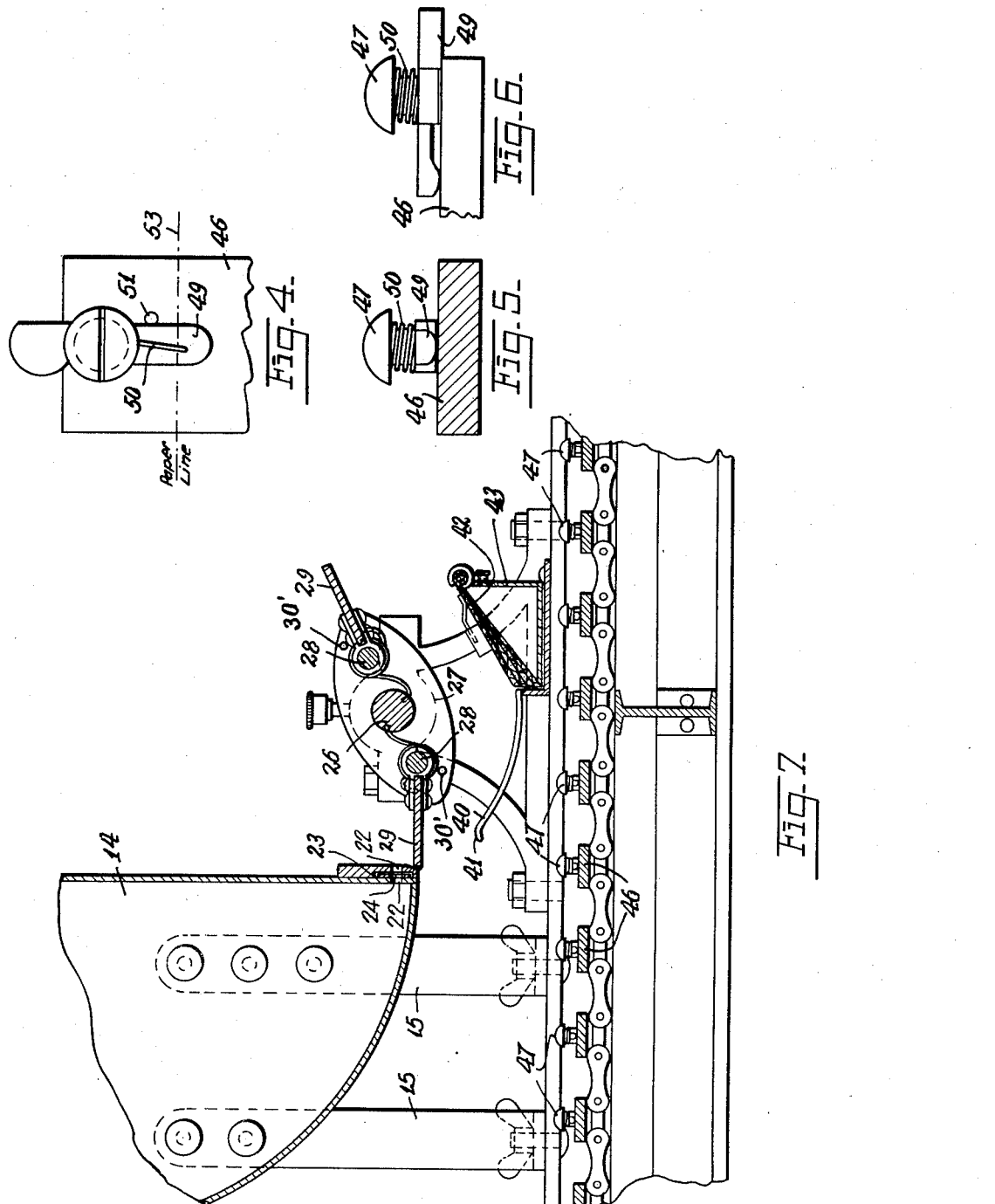

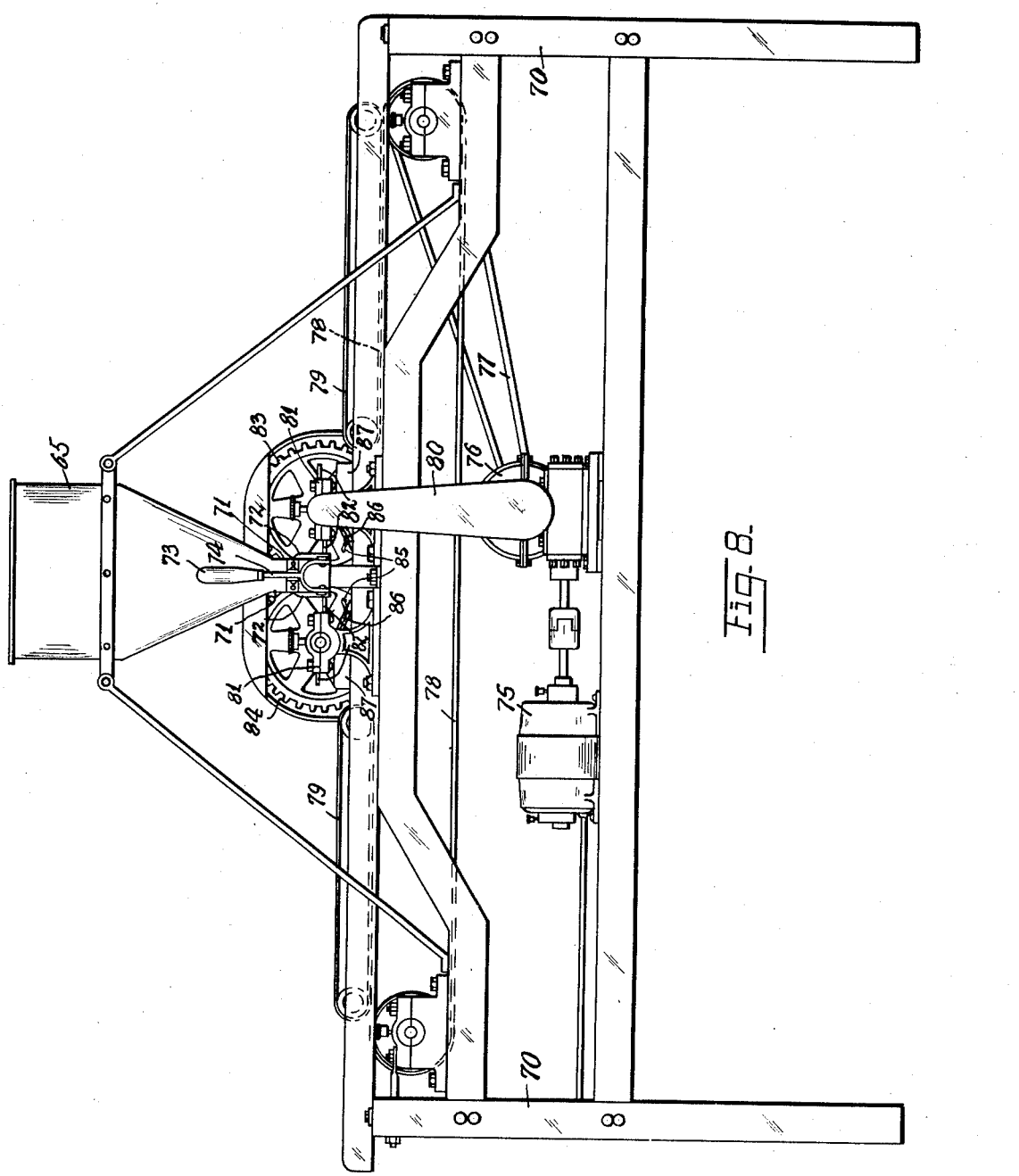

Patented June 5, 1934

1,961,966

UNITED STATES PATENT OFFICE 1,961,966

COOKY PASTE DROPPER

Mario A. Gerola, Brooklyn, N. Y.

Application September 14, 1932, Serial No. 633,063
Renewed April 14, 1934

8 Claims. (Cl. 107—27)

This invention relates to new and useful improvements in a cooky paste dropper.

The invention has for an object the construction of a machine as mentioned which is characterized by the provision of scraper blades adapted to successively engage cooky paste discharged from openings in a container so as to continuously cut off portions of the cooky paste and drop them upon a suitable conveyer.

As a further object of this invention an arrangement is proposed whereby said scraper blades come into contact with cleaning and wetting mechanism after each discharge of cooky paste.

As a still further object of this invention it is proposed to construct a cooky paste container with openings on opposite sides and to provide a dual mechanism for cutting and dropping the cooky from each of the sides simultaneously.

Furthermore as another object of this invention it is proposed to construct a device as mentioned, which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a fragmentary enlarged detailed view of a portion of Fig. 2.

Fig. 4 is a fragmentary enlarged detailed view of a portion of Fig. 3 showing in particular the catches for the paper web upon the conveyer of the device.

Fig. 5 is a sectional view of Fig. 4.

Fig. 6 is a side elevational view of Fig. 5.

Fig. 7 is a fragmentary enlarged sectional view as though taken on the line 7—7 of Fig. 2.

Fig. 8 is a side elevational view of a machine constructed according to a modification of the invention.

Fig. 9 is an elevational view looking in the direction of the line 9—9 of Fig. 2.

Figure 1:
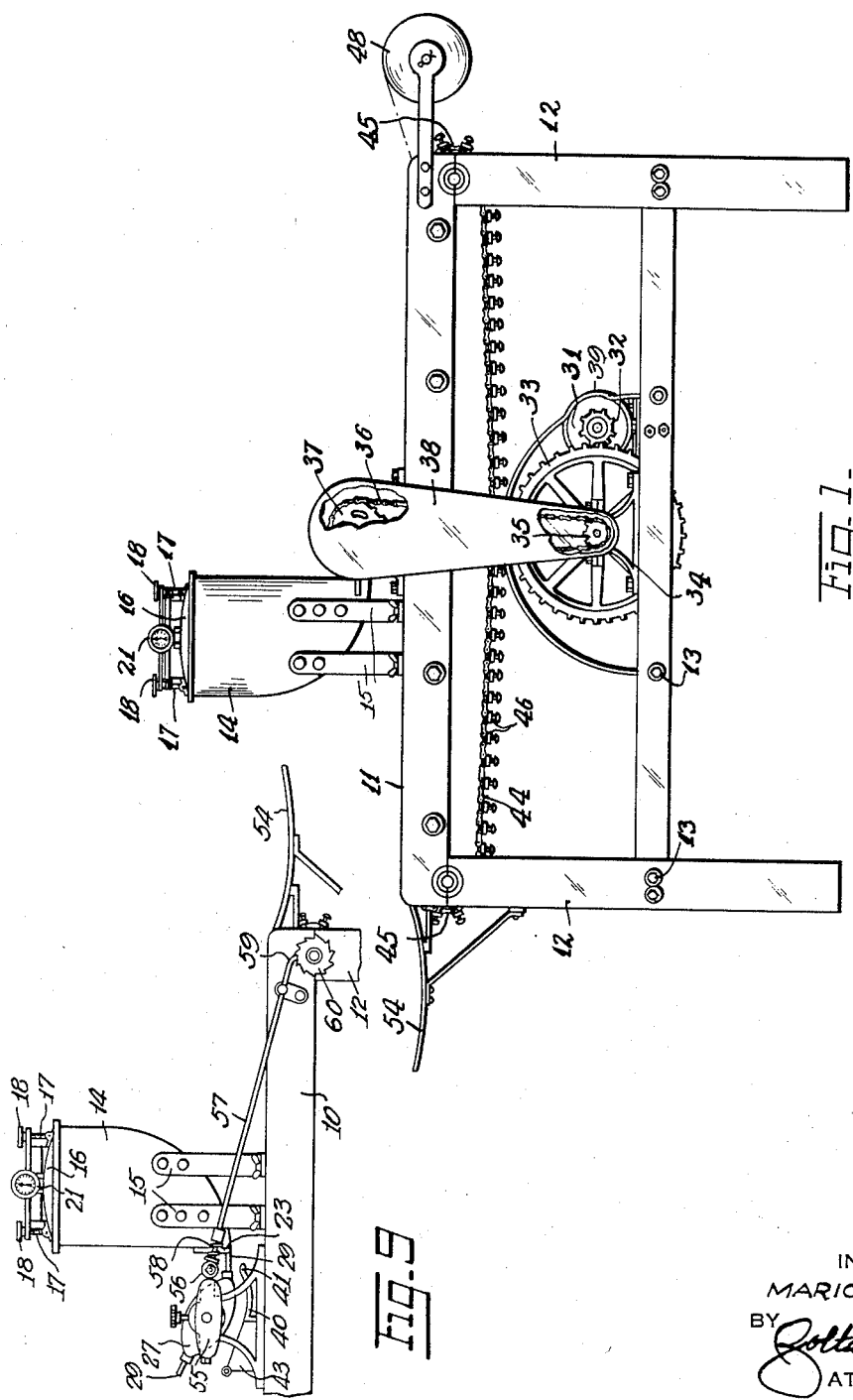
Fig. 1 is a side elevational view of a device constructed according to this invention.
Figure 2:
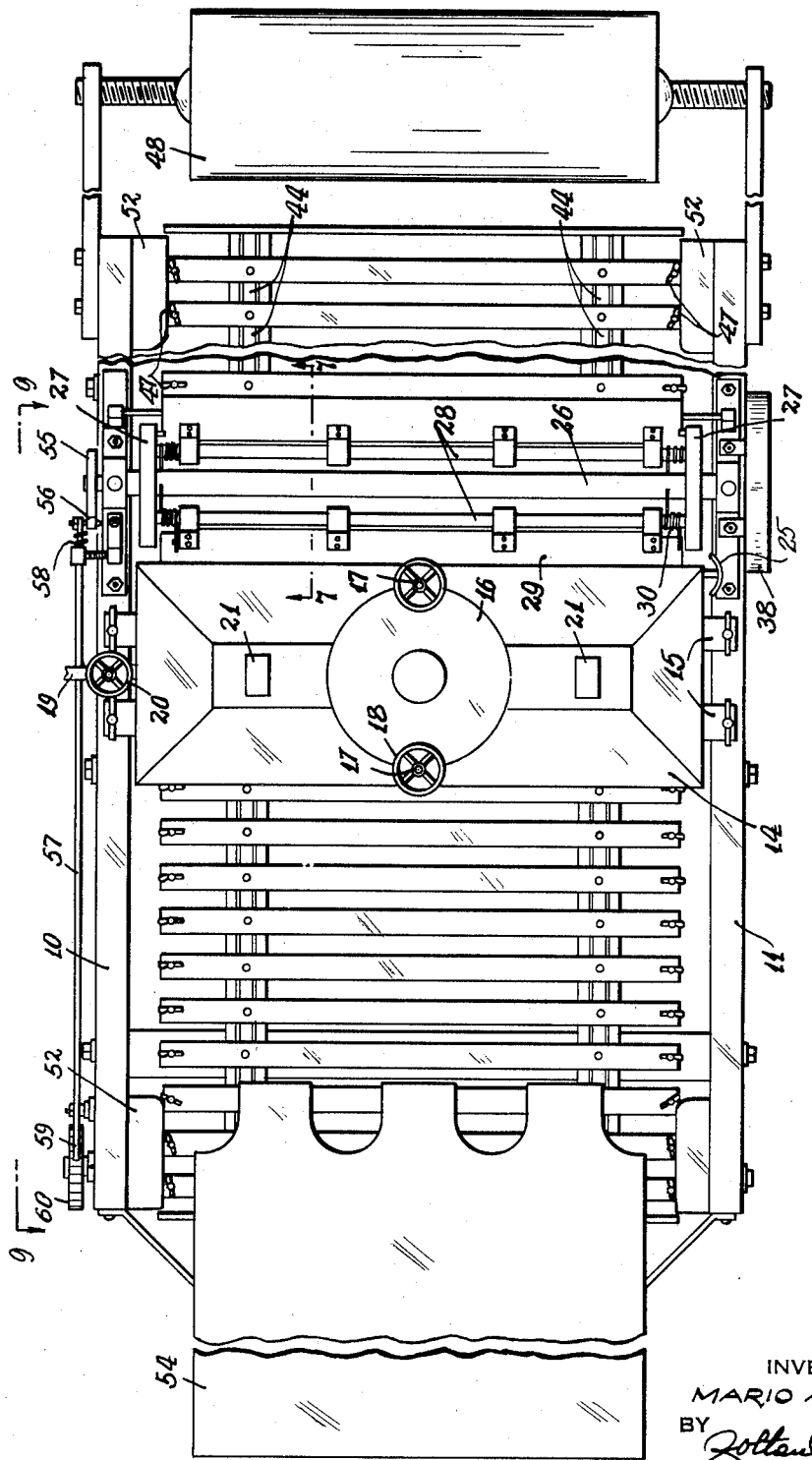
Fig. 2 is a plan view of Fig. 1.

It is thought advisable at the beginning of the description of the device illustrated in Figs. 1–7 inclusive, to point out that but one embodiment of the invention is shown but it must be recognized that various changes can readily be made without departing from the gist of the invention itself. For this reason the design in Fig. 8 has also been shown, in fact, the design of Fig. 8 is a preferred construction because of its dual action.

The cooky paste dropper machine according to this invention comprises a frame composed of spaced longitudinal members 10 and 11 supported upon the legs 12 and joined as a unit by the provision of a plurality of spaced bolts 13. Further details of the frame is thought not necessary since the device will be readily understandable from the brief disclosure. A cooky paste discharge container 14 is supported upon the frame particularly by the provision of support members 15 connected between the sides of the container 14 and the longitudinals 10—11. This container 14 is adapted to hold a cooky paste which may be placed therein by the removal of a cover 16 upon the container.

The cover 16 is clamped in place by the provision of a pair of screws 17 on opposite sides of the cover and projecting from the top of the container and provided with clamping hand wheels 18. To induce the forcing of the cooky paste from the bottom of the container, hereinafter fully described, provision is made for supplying compressed air into the top of the container. This means includes an entrance pipe 19 provided with a globe valve 20. Pressure gages 21 are mounted on the top of the container to indicate this internal pressure.

The discharge of the container 14 comprises the arrangement of a plurality of apertures 22 extended in a horizontal row along the bottom of one side of the container. The bottom of the container is formed curved towards this side, clearly in Fig. 1 so that cooky paste is forced from the openings. A control slide 23 is engaged over the openings 22 and is formed with openings 24 adopted to register with the openings 22 in a certain position. This slide frictionally maintains its place. It is provided with a handle 25 by which it may be movable to positions in which the openings 22 are in full alignment with the openings 24 or partially aligned so as to control the amount of cooky paste ejected.

A shaft 26 is rotatively supported in bearings mounted upon the longitudinals 10—11, and said shaft is parallel and spaced from the bottom of the container 14 and substantially on the same level as the openings 22. A pair of plates 27 is secured upon the shaft 26 immediately adjacent the inner sides of the longitudinals 10—11. Eccentrically supported on these plates 27 is a pair of diametrically opposite shafts 28. A scraper blade 29 is hingedly mounted on each of these shafts and is resiliently urged into normal position by springs 30 arranged coaxially upon the shafts 28 and acting between the blades 29 and the shaft 26 which force blades 29 against stop pins 30'. The scraper blades 29 may flex in one direction. In Fig. 7 the scraper blade 29 to the right is shown in its neutral position while the scraper blade to the left is shown flexed into a position which is naturally taken when the paste is stripped.

A means is provided for rotating the shaft 26 and comprises an electric motor 31 supported upon the frame of the machine and provided with a pinion 32 meshing with a gear 33 rotatively supported on a bearing block 34 supported on the frame of the machine. A sprocket 35 is fixed coaxially with the gear 33 and meshes with a chain 36 and engaging over a sprocket 37 fixed upon the shaft 26. A cover 38 encases the sprockets 35—37 and the chain 36, another cover 39 covers the electric motor 31 and the gear 33.

As the shaft 26 rotates the scrapers 29 will engage against cooky paste projecting from the openings 22 and 24. Stop plates 40 are supported upon the frame of the machine and is located immediately below the paste container 14 and in the path of motion of the scrapers 29 when the scrapers cut off the cooky paste in a manner so that when the scrapers abut against stop plates 40 the cooky paste is immediately forced off the scraper plate and caused to drop down. For this purpose the free end of the stop plate 40 is formed with a curved end 41. A mechanism is provided for cleaning and wetting the scraper blades so that it is ready for the next stripping operation. This means comprises a piece of wet felt rigidly fixed in the path motion of the scraper blade 29 immediately after the blade leaves the stopping plate 40. The felt 42 is fixed upon a reservoir washing the blades clean of the paste with cleansing fluid which saturates the felt 42.

Provision is made for conveying the cookies away after they are cut. In detail this means comprises an endless conveyer composed of endless chains 44 extended over sprockets 45 supported upon the frame of the machine. Equally spaced upon these chains 44 are located a plurality of transverse strips 46. At the ends of each of these strips there is provided an automatic paper clamp 47. This clamp is adapted to clamp a paper web guided from a roll of paper 48 supported upon one end of the frame of the machine. The paper is perforated in order to tear off in sections and to bake the raw cooky paste.

Each of the paper clamps 47 comprises a finger 49 urged into a transverse position by a spring 50. A peg 51 limits the closing position of the finger 49. Cam elements 52 are arranged upon the longitudinals 10—11 at the ends of the frame in a manner so that the web has the opportunity to engage upon the transverse strips 46 and thereafter to be clamped in position. The cams 52 cause the clamps 47 to turn into longitudinal positions in which positions they cannot grip the paper in that the paper is out of reach. Dot dash lines 53 in Fig. 4 illustrate the edge of the paper and it will be recognized that if the clamp finger 49 be turned longitudinally, the paper will be free. The intention is that the web of paper be held during its passage beneath the container 14 so as to receive the paste which is dropped therein. At the end of the frame remote from the end provided with the roll of paper 48 there is provided a guiding table 54 adapted to guide the paper after it is released by the clamps 47.

A means is provided for slowly moving the conveyer, and comprises a cam 55 fixed upon the shaft 26 and engaging against a follower 56 upon a rod 57 slidably supported on the longitudinal 10. A spring 58 urges the rod 57 so that the follower 56 engages the cam 55. The other end of the rod 57 is provided with a pawl 59 engaging a ratchet wheel 60 fixed coaxially with the sprockets 45. It will readily be understood that as the rod 57 reciprocates the ratchet wheel will be caused to turn and so cause operation of the conveyer.

The operation of the machine may be traced by assuming cooky paste to be discharging from the openings 22—24. This discharge will be slow due to the viscosity of the paste which is being forced through the openings by the air pressure. As the shaft 26 rotates the scraper blades 29 will engage against the discharging cooky paste and cut pieces off which pieces are caused to drop upon the web paper. The conveyer carries the web away and in this manner the cooky is continuously discharging and being moved away.

In Fig. 8, a modified form of the machine has been disclosed in which the container 65 is shown supported upon the frame 70 of the machine. This container is open at the top and atmosphere is depended upon to cause the flowing out of the paste from the container. The container 65 is tapered at the bottom and is provided with flat sides 71. Each of these sides is formed with openings not shown but similar to the openings 22 previously described. These openings are controlled by slides 72 adapted to be moved by a handle 73 which is pivotally mounted intermediately at 74 and which at this other end connects with the slides 72. A motor 75 is used to transmit rotations to a gear reduction unit 76. This unit is provided with a drive 77 driving an endless conveyer 78. This endless conveyer 78 is provided with supplementary idler endless conveyer sections 79 acting over the top lay of the conveyer 78 at the edges so as to direct the paper instead of the provision of the clamps 47 described in the previous form. Since the endless conveyer sections 79 are arranged along the edges only of the conveyer 78, the central portion of the conveyer 78 is free so that the cooky paste may rest upon the paper extended over the conveyer.

From the gear reduction unit 76 there also extends a drive 80 adapted to drive the scraper blades 82. A gear 83 is connected with the members 81 and meshes with another gear 84 working another scraping mechanism located on the other side of the container 65. The scraper blades of this dual mechanism are indicated by reference numerals 82.

Mechanisms are provided for keeping the scraper blades 82 clean and comprise stopping plates 85 similar to stopping plates 40. Immediately after the blades cut they engage with felt members 86. Each of the felt members 86 are connected with water boxes 87 so that the water can be slowly drawn. The parts not described in great detail will be recognized from an understanding of the form of the invention described relative to Figs. 1–7 inclusive.

The operation consists in rotations from the motor 75 being transmitted to drive the conveyer 78 and simultaneously transmitted rotations to cause turning of the members 81 and consequent action of the scraper blades 82 against the sides of the slides 72. The stopping plates 85 are arranged only at the ends of the scraper blades 82 so that the cut cooky may fall down upon the conveyer 78. The paste from the conveyer belt will be moved along so as to make room for the new cooky falling down. The relation between the turning members 81 and the conveyer should be such that the cooky paste from the sides of the hopper do not deposit one upon the other. The paper may be fed in either direction depending upon the direction of rotation of the motor.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A cooky paste dropper, comprising a frame, a cooky paste discharge container supported on said frame and having a plurality of discharging openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adopted to cut off the cooky paste discharging from said openings, means for rotating said shaft, cleaning mechanism in the path of motion of said scraper blades, an endless conveyer on said frame supported below said container, means for moving said endless conveyer, and means for holding a paper web over said conveyer during its operation.

2. A cooky paste dropper, comprising a frame, a cooky paste discharge container supported on said frame and having a plurality of discharging openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adopted to cut off the cooky paste discharging from said openings, means for rotating said shaft, cleaning mechanism in the path of motion of said scraper blade, an endless conveyer on said frame supported below said container, means for moving said endless conveyer, and means for holding a paper web over said conveyer during its operation, said control slide being frictionally held and provided with a handle.

3. A cooky paste dropper, comprising a frame, a cooky paste discharge container supported on said frame and having a plurality of discharging openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adopted to cut off the cooky paste discharging from said openings, means for rotating said shaft, cleaning mechanism in the path of motion of said scraper blades, an endless conveyer on said frame supported below said container, means for moving said endless conveyer, and means for holding a paper web over said conveyer during its operation, said scraper blades being resiliently held in positions.

4. A cooky paste dropper, comprising a frame, a cooky paste discharge container supported on said frame and having a plurality of discharge openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adapted to cut off the cooky paste discharging from said openings, means for rotating said shaft, cleaning mechanism in the path of motion of said scraper blades, an endless conveyer on said frame supported below said container, means for moving said endless conveyer, and means for holding a paper web over said conveyer during its operation, said scraper blades being resiliently held in positions, comprising springs acting between said scraper blades and said shafts.

5. A cooky paste dropper, comprising a frame, a cooky paste discharge container supported on said frame and having a plurality of discharging openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adapted to cut off the cooky paste discharging from said openings, means for rotating said shaft, cleaning mechanism in the path of motion of said scraper blades, an endless conveyer on said frame supported below said container, means for moving said endless conveyer, and means for holding a paper web over said conveyer during its operation, said mechanism for rotating said shaft comprising an electric motor, and a transmission system connecting said motor and shaft.

6. A cooky paste dropper, comprising a frame, a cooky paste discharge container supported on said frame and having a plurality of discharging openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adapted to cut off the cooky paste discharging from said openings, means for rotating said shaft, cleaning mechanism in the path of motion of said scraper blades, an endless conveyer on said frame supported below said container, means for moving said endless conveyer, means for holding a paper web over said conveyer during its operation, another control slide upon the other side of the said container and engaging over a second group of discharge apertures, a shaft rotatively mounted on said frame, plates on said shaft, scraper blades on said plates, means for rotating second shaft, and a cleaning and wetting device in the path of motion of said latter blades.

7. A cooky paste dropper, comprising a frame, a cooky paste discharge container supported on said frame and having a plurality of discharging openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adapted to cut off the cooky paste discharging from said openings, means for rotating said shaft, cleaning mechanism in the path of motion of said scraper blades, an endless conveyer on said frame supported below said container, means for moving said endless conveyer, means for holding a paper web over said conveyer during its operation, another control slide upon the other side of the said container and engaging over a second group of discharge apertures, a shaft rotatively mounted on said frame, plates on said shaft, scraper blades for said plates, means for rotating second shaft, and a cleaning and wetting device in the path of motion of said latter blades, said control slides being connected for unitary control.

8. A cooky paste dropper, comprising a frame, a cooky paste discharge container supported on said frame and having a plurality of discharging openings on the bottom edge, a control slide on said container and having openings alignable with said discharge openings and movable to control passage thru said discharge openings, a shaft rotatively supported across said frame and parallel to the discharge side of said container, plates on said shaft, scraper blades pivotally mounted on said plates eccentrically and adapted to cut off the cooky paste discharging from said openings, means for rotating said shaft, cleaning mechanism in the path of motion of said scraper blades, an endless conveyer on said frame supported below said container, means for moving said endless conveyer, means for holding a paper web over said conveyer during its operation, another control slide upon the other side of the said container and engaging over a second group of discharge apertures, a shaft rotatively mounted on said frame plates on said shaft, scraper blades on said plates, means for rotating second shaft, and a cleaning and wetting device in the path of motion of said latter blades, said cleaning and wetting device comprising a water box, a felt member extending from said box and disposed in the path of motion of said scraper blades.

MARIO A. GEROLA.